United States Patent [19]
Unruh

[11] 3,991,847
[45] Nov. 16, 1976

[54] STEERING SYSTEM FOR AN ARTICULATED VEHICLE
[75] Inventor: Dale H. Unruh, Peoria, Ill.
[73] Assignee: Caterpillar Tractor Co., Peoria, Ill.
[22] Filed: Aug. 14, 1975
[21] Appl. No.: 604,570

[52] U.S. Cl. ............................................... 180/135
[51] Int. Cl.² ........................................... B62D 5/06
[58] Field of Search ......... 180/79.2 B, 79.4, 79.2 C, 180/50, 51, 52

[56] References Cited
UNITED STATES PATENTS

| | | | |
|---|---|---|---|
| 2,557,066 | 6/1951 | Armington | 180/79.2 B |
| 2,582,142 | 1/1952 | Martin | 180/79.4 X |
| 2,863,234 | 12/1958 | Armington | 180/79.2 B X |
| 3,515,235 | 6/1970 | Kamner | 180/79.2 B |
| 3,527,315 | 9/1970 | Hampton | 180/79.2 B |
| 3,529,690 | 9/1970 | Mathew | 180/79.2 B X |

Primary Examiner—Robert R. Song
Assistant Examiner—R. Schrecengost
Attorney, Agent, or Firm—Wegner, Stellman, McCord, Wiles & Wood

[57] ABSTRACT

A steering system for an articulated vehicle having one axle mounted thereon in a wagon-steer mode in addition to the conventional articulated-steer mode. A steering control valve, which is responsive to the movement of a manual steering control element, is ported to admit hydraulic fluid sequentially, first to a pair of wagon-steer cylinders and then to a pair of articulated-steer cylinders in both left and right steering control. The steering of the vehicle is initially through the wagon-steer movement of the one axle to facilitate high speed handling, which requires relatively small directional changes in the steering system, and is secondly through the articulated-steer movement in sequence to the wagon-steer movement to facilitate low speed maneuvering, which requires large directional changes in the steering system.

4 Claims, 4 Drawing Figures

STEERING SYSTEM FOR AN ARTICULATED VEHICLE

BACKGROUND OF THE INVENTION

This invention relates to a steering system for an articulated vehicle that operates by hydraulic steering cylinders or jacks, and more particularly, to a two-part steering system, including a pair of wagon-steer cylinders connected to the front axle (or rear axle) mounted in a wagon-steer mode for effecting relatively small directional changes of the steering at high speeds and sequentially operating therewith, a conventional pair of articulated steer cylinders for effecting the larger directional changes of the steering desired for maneuvering at low speeds.

Certain off-road earth moving vehicles, such as tractors, loaders and scrapers and log skidders, as well as articulated agricultural tractors, are effectively steered through hydraulic controls rather than by means of direct mechanical linkages. Articulated vehicles of this type usually have two body sections with a pivot therebetween and a pair of hydraulic cylinders, connected between the two body sections, with one cylinder mounted on each side of the pivot connection and hydraulically connected to work together. The steering is accomplished by extending one cylinder, while simultaneously retracting the other, to force pivoting of the vehicle parts at the joint relative to each other. Conventionally, an axle supports each vehicle part, and steering is accomplished solely through articulation of the vehicle while full power is delivered to both axles.

To control the cylinders in an articulated steering system, a steering wheel is utilized which operates the conventional pilot valves to pressurize a hydraulic pilot operated steering control valve connected between the steering cylinders and a source of pressurized hydraulic fluid flow for operation of the steering system. Accordingly, rotation of the steering wheel moves the above valve controls and actuates the steering cylinders to turn the vehicle in a first direction, and rotation of the wheel in the opposite direction moves the valve controls to produce a reverse operation of the steering cylinders. The hydraulic circuit includes a conventional hydraulic operated feedback system which senses the pivoting movement and deactivates the steering cylinders when the turning of the steering wheel ceases so that the operator may steer the vehicle by manipulation of the steering wheel in a conventional manner similar to that shown in U.S. Pat. No. 3,444,948.

An advantage of articulated-steer vehicles is the direct transmission connection to its solid axles which eliminates driving power loss due to universal drive joints found in other types of vehicles. However, basic requirements of acceptable steering system for an articulated steer vehicle is a directional control response that gives good low speed maneuverability and adequate high speed handling. Typically, the steering system of an articulated-steer vehicle exhibits a directional control response that is proper for low speed maneuverability, but limits the top speed capability of the vehicle as compared to Ackerman-steer vehicles.

SUMMARY OF THE INVENTION

It is a primary object of the present invention to provide a steering system for an articulated vehicle which has an improved high speed directional control response and which also retains the driving power to the articulated-steer vehicle axles.

A further object of the present invention is to provide a steering system for an articulated vehicle which utilizes a two-part steering system including an axle mounted on the front body section of the vehicle in a wagon-steer mode and a conventional articulated steering system in which only the wagon-steer portion is activated for the small directional corrections required for steering the vehicle at high speeds while the articulated-steer portion is activated in conjunction with the wagon-steer portion for large directional angles required for steering the vehicle at low speeds.

Another object of the present invention is to provide a steering system for an articulated vehicle which further includes a transducer means for generating an output signal proportional to the roll angle of the vehicle mass to activate a correction to an oversteer situation or to add a specified amount of understeer. A sensor circuit is operatively connected to the output of the transducer to activate a solenoid controlled pilot valve with direct pilot pressure to move the steering control valve position so as to admit hydraulic fluid flow to the wagon-steer cylinders changing the setting of the wagon-steer axle relative to the vehicle to add understeer or to correct an oversteer condition. The correction may occur through the operation of the sensor circuit without requiring the rotation of the steering wheel.

One feature of the invention is the provision for mounting the axle in wagon-steer mode directly to the frame of the front body section by a ball joint connection on the top of the axle for vehicles that do not require a hydraulic strut suspension system.

DESCRIPTION OF THE PREFERRED EMBODIMENT

Figure 1:
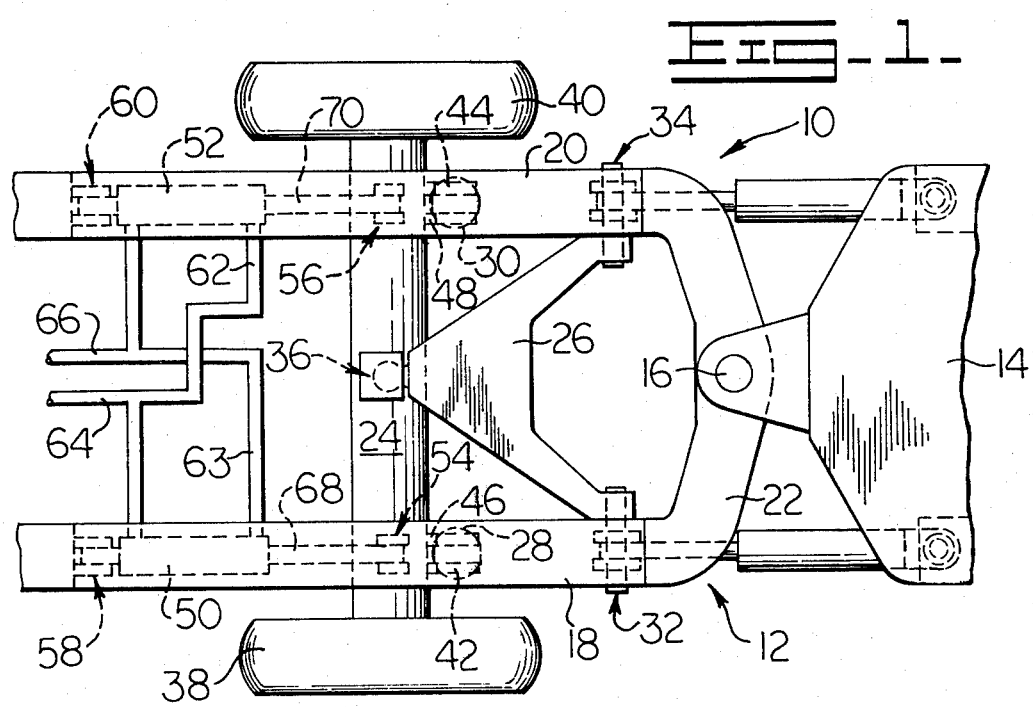
FIG. 1 is a fragmentary plan view of a portion of an articulated vehicle embodying the two-part steering system of the present invention.

The two-part steering system for an articulated vehicle, such as a loader, scraper or the like, is shown generally in FIG. 1, wherein the vehicle body, indicated at 10, includes a front body section 12 and a rear body section 14 which articulate about a pivot connection 16 therebetween. Articulated steering is accomplished by a pair of hydraulic cylinders (FIG. 3) connected between the two body sections in the conventional manner, each of the cylinders being on a separate side of the pivot connection 16. The articulated-steer cylinders are cross-connected across the pivot connection 16 in such a manner that steering is effected by extending one cylinder while simultaneously retracting the other to force pivoting between the body sections 12 and 14 at the pivot joint 16.

To control the articulated-steer cylinders in this type of system, it is customary to utilize a steering wheel which operates the conventional pilot and steering control valves, as previously described, that are connected between the cylinders and a source of pressurized hydraulic fluid flow. Turning of the steering wheel in a particular direction actuates a pilot valve which allows hydraulic flow to move a spool element within the steering control valve to open its ports for supplying pressurized fluid to the head end of one articulated-steer cylinder and the rod end of the other. This general valve structure and arrangement of steering cylinders are the same as that shown in U.S. Pat. Nos. 3,795,177 and 3,444,948, respectively, owned by the assignee of this application, and reference may be made thereto for a more complete description of the components to the articulated-steer system.

The front body section 12 includes two frame rails 18 and 20 which are spaced apart in a parallel relationship to one another on opposite sides of the vehicle's superstructure and joined together at the pivot connection between the body sections by a frame member 22. An axle 24 may be secured to the vehicle's front body section 12 in a wagon-steer mode by a yoke member 26 and hydraulic struts 28 and 30. Yoke member 26 is pivotally connected on one end to the frame rails 18 and 20 by pins 32 and 34 respectively. The opposite end of the yoke member 26 is engaged at the mid-point of the axle 24 by a ball joint 36. The driven wheels 38 and 40 are mounted in a conventional fashion on the wagon-steer axle 24. Struts 28 and 30 are pivotally connected at points 42 and 44 with their respective frame rails 18 and 20. The struts extend downwardly and are attached to mounting brackets 46 and 48 which are welded to opposite ends of the wagon-steer axle 24.

Figure 2:
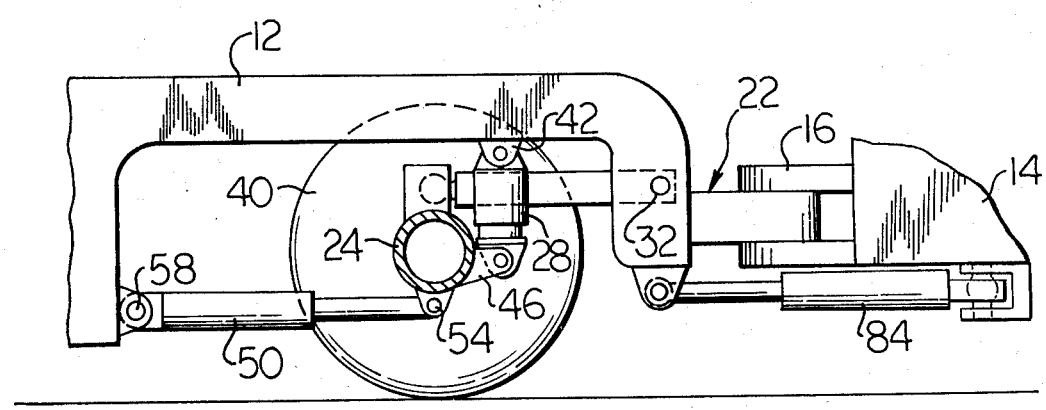
FIG. 2 is a fragmentary, partially sectioned, side elevation of the front body section of the vehicle illustrated in FIG. 1.

A pair of wagon-steer cylinders 50 and 52 are horizontally disposed between the wagon-steer axle 24 and frame rails 18 and 20. Each end of the horizontally disposed wagon-steer cylinders is pivotally mounted, one end to the wagon-steer axle 24 at points 54 and 56, and the other end to the frame rails at points 58 and 60, as shown in FIGS. 1 and 2.

In FIG. 1, the wagon-steer cylinders 50 and 52 are cross-connected across the vehicle by conduits 62 and 63 in communication with the rod end of one cylinder and the head end of the other. The head end of cylinders 50 and 52 are connected to a steering control valve via conduits 64 and 66, respectively. With the cross-connection between the wagon-steer cylinders, an operator of the vehicle can make directional adjustments in the steering system of approximately 3 degrees on either side of a straight path by actuation of the wagon-steer cylinders 50 and 52. For example, a left turn is initiated through manipulation of a manual control in that particular direction which opens the ports of the steering control valve so that it supplies pressurized hydraulic fluid via conduit 62 to the head end of wagon-steer cylinder 50 and to the rod end of wagon-steer cylinder 52 from inlet conduit 64 which results in the extension of the cylinder rod 68 and the retraction of cylinder rod 70 in cylinders 50 and 52, respectively. With the extension of cylinder rod 68, hydraulic fluid is expelled from the rod end of cylinder 50 into conduit 63 and travels across the vehicle to conduit 66 which also receives fluid from the head end of cylinder 52 as cylinder rod 70 is retracted. The extension and retraction of the wagon-steer cylinders rotates the axle 24 about the ball joint 36 in both left and right steering control up to a 3 degree maximum turn in either direction for high speed corrections in the steering system.

Figure 3:
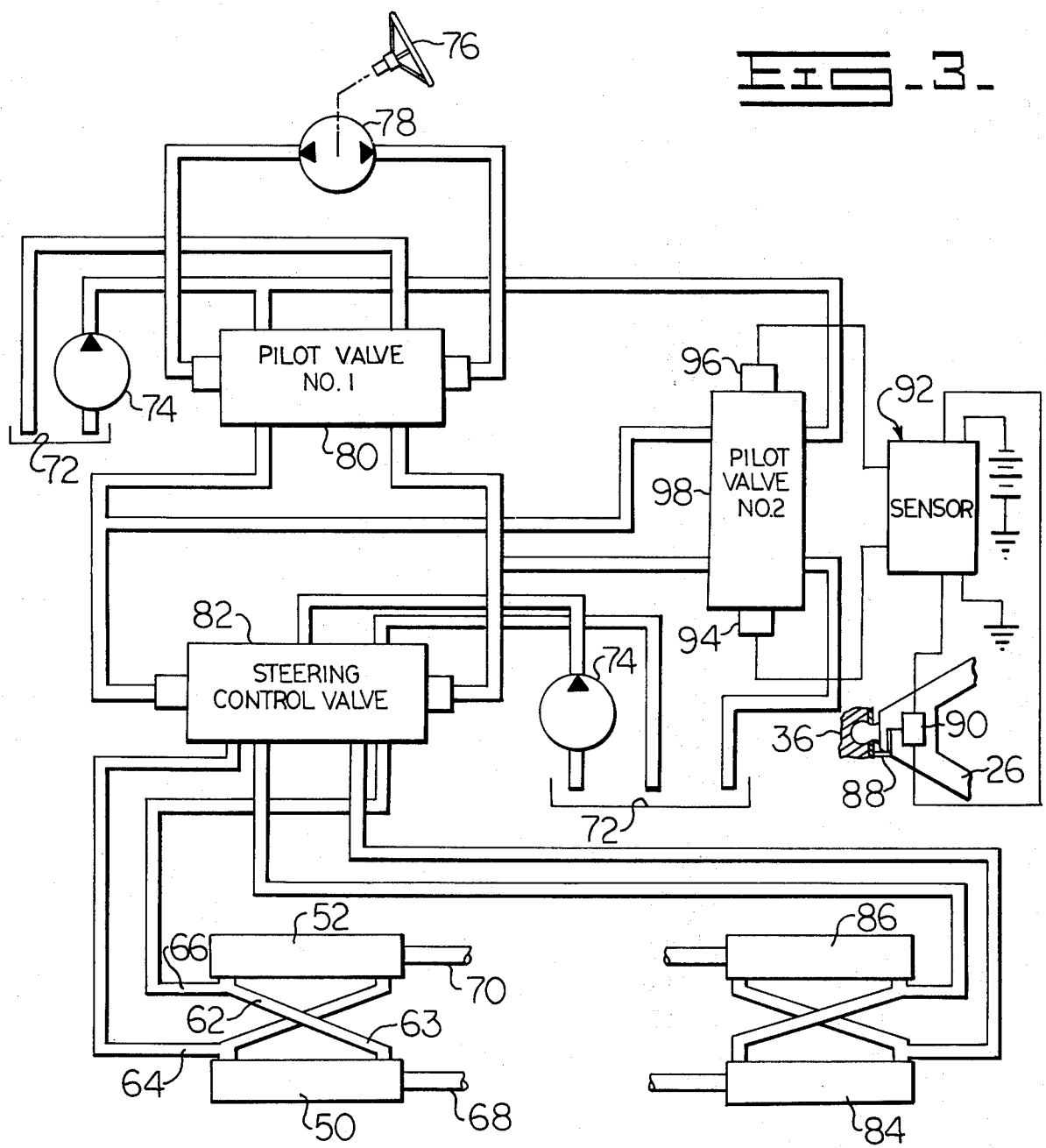
FIG. 3 is a schematic diagram of the hydraulic circuit employed.

Referring now to FIG. 3, there is shown a schematic diagram of the hydraulic circuit used to steer the articulated vehicle. A pressurized hydraulic fluid is supplied to the valves of the hydraulic circuit from a reservoir 72 by a pump 74. A conventional steering wheel 76 operates a bi-directional steering pump 78 which is responsive to the turning of the steering wheel in a particular direction. Depending upon the direction in which the steering wheel 76 is turned, pilot pressure from the bi-directional steering pump 78 is directed to one of two pilots in a pilot valve 80 (pilot valve No. 1) for selectively moving a valve spool control element (not shown) positioned axially within the pilot valve 80 in left and right steering control. The valve spool control element within the pilot valve 80 is of the same general type disclosed in the previously mentioned U.S. Pat. No. 3,795,177 entitled "Fluid Motor Control Circuit Providing Selective Fast Motion", which has a spool element that may be shifted axially between different valve positions. With the axial movement of the spool within valve 80, pressurized hydraulic fluid from the pump 74 is directed from pilot valve 80 to the pilot ends of a steering control valve 82 which also includes a valve spool control element functioning similar to the one previously described for pilot valve 80. Depending upon direction in which the steering wheel 76 is turned, the spool control element of the steering control valve correspondingly moves axially either to the right or to the left in response to the pilot pressure from the pilot valve 80. The distance in which the spool element shifts within the steering control valve 82 is directly proportional to the rotation of a steering wheel, the feedback system being operable to maintain the proportional movement specified.

The steering control valve 82 is responsive to a first movement of the steering wheel for directing the pressurized hydraulic fluid from the pump 74 to the pair of cross-connected wagon-steer cylinders. Then, with a further rotation of the steering wheel in excess of the first movement, the pressurized hydraulic fluid from the pump 74 is directed through the steering control valve 82 to the pair of cross-connected articulated-steer cylinders 84 and 86. The reason for the sequential flow of pressurized fluid, is that, the steering control valve 82 is ported to sequentially admit pressurized hydraulic fluid to flow into the wagon-steer cylinders 50 and 52 first upon small increments of spool movement and then into the articulated-steer cylinders 84 and 86 as the spool element of the steering control valve shifts axially therein upon greater increments, still in proportion to the rotation of the steering wheel 76. The valve spools are returned to a central position by a conventional follow-up system as previously described.

Through use of the present system, steering of an articulated vehicle is accomplished initially through the wagon-steer movement of the axle 24 and may be the sole steering employed under high speed directional control. At higher speeds, travelling generally in a straight line, generally requires but relatively small directional corrections in the steering. So long as the correction needed is within the 3 degree capability of the wagon-steer mode changes, the articulated steer cylinders may not be activated. The desirable maneuverability of the vehicle, at lower speed which requires a larger steering angle for normal working conditions is maintained in this system by a greater rotation of the steering wheel which will also activate the articulated-steer cylinders. The pairs of cylinders are activated sequentially at all speeds of vehicle movement, should the steering require more than 3 degrees of correction.

An additional feature of the invention is an automatic compensation for oversteer in the system which is caused by the rolling of the vehicle's superstructure, as in a turn. For example, when the roll angle of the mass with respect to its wheeled support exceeds a predetermined amount, a mechanical linkage 88 located between the part of the ball joint secured to the axle 24 and a transducer 90 which is mounted on the yoke 26 as shown in FIG. 3, will be displaced an incremental distance. The transducer 90 is responsive to the incremental displacement of the linkage 88 and generates a signal directly proportional to the roll angle encountered. The transducer signal is picked up by sensor circuit 92 which in turn energizes one of two solenoids 94 and 96 located on opposing ends of a pilot valve 98. The actuation of either solenoid axially shifts a spool control element within the pilot valve 98 (pilot valve No. 2) in a right or left direction corresponding to the solenoid actuated. The shifting of the spool control element within the pilot valve 98 permits pilot pressure to flow therethrough into the pilot lines of the steering control valve 82.

Pressurizing the pilot end of the steering control valve will result in admission of hydraulic fluid, to the wagon-steer cylinders to reduce oversteer or to add a specified amount of understeer. No rotation of the steering wheel by the vehicle operator is required. As this control action occurs, the sensing circuit will operate to bring the steering control valve back to its central position in which no further hydraulic flow to the steering cylinders occurs.

The actuation of the pilot valve 98 may be accomplished in ways other than the electrical circuitry shown in FIG. 3. For example, a hydraulic circuit may replace the electrical one shown in FIG. 3 or the pilot valve 98 could be mounted directly on the yoke and be actuated mechanically by linkage connected between the axle 24 and the valve 98.

Figure 4:
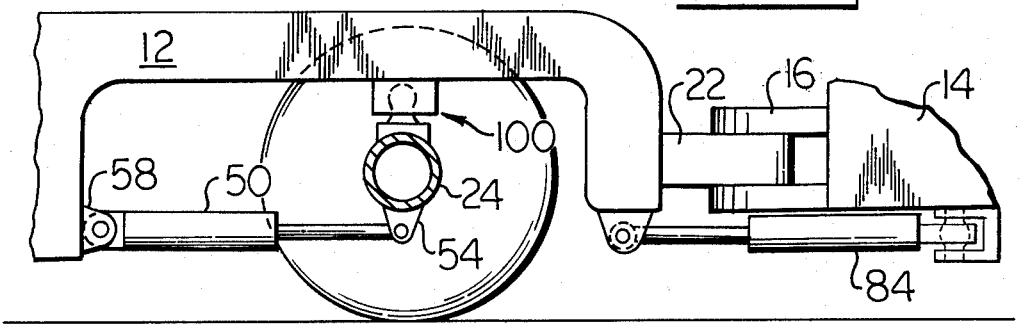
FIG. 4 is a view similar to FIG. 1 illustrating an alternative embodiment for mounting the axle in a wagon-steer mode.

FIG. 4 shows a means for mounting the axle 24, alternative to that shown in FIGS. 1 and 2. The hydraulic struts 28 and 30 are eliminated by mounting the wagon steer axle 24 directly to the frame by a centrally located ball joint 100 secured to the top of the axle 24. The ball joint provides for movement of the vehicle relative to the rigid axle as well as wagon steering of the axle relative to the frame.

The two-part steering system of this invention provides an articulated vehicle with the advantages derived from a conventional articulated steering system and at the same time with advantages of a more responsive steering system which is required for improved directional control characteristics at high speeds. An additional benefit of this steering system is the automatic oversteer/understeer control system that without operator endeavor will correct an oversteer condition or add a specified amount of understeer control. The steering system may compensate for an oversteer condition or add understeer in addition to providing improved handling characteristics to both low and high speed operation of an articulated vehicle.

I claim:
1. A steering system for an articulated vehicle having an axle mounted thereon in wagon-steer mode, comprising:

a pair of articulated steer cylinders operatively mounted on said vehicle for articulated steering movement of the vehicle;
a pair of wagon-steer cylinders operatively mounted on said vehicle for steering movement of said axle mounted in wagon-steer mode for about 3° left and right movement;
a source of pressurized hydraulic fluid flow for actuation of said steering cylinders;
a pilot valve and a manually controlled steering member for moving the pilot valve selectively in left and right steering control;
a steering control valve for controlling hydraulic flow to and from said steering cylinders, hydraulic connection means providing for movement of the control valve responsive to movements of said pilot valve;
hydraulic flow connections from said source through said steering control valve to said cylinders, said control valve being ported to admit hydraulic fluid sequentially first to said wagon-steer cylinders and only then to said articulated steer cylinders in both left and right steering control, whereby steering of the vehicle in both left and right directional steering is initially through wagon-steer movemement of said wagon-steer mode axle facilitating high speed handling of the vehicle with relatively small directional changes.

2. A steering system for an articulated vehicle having an axle mounted thereon in wagon-steer mode, comprising:
a pair of articulated steer cylinders operatively mounted on said vehicle for articulated steering movement of the vehicle;
a pair of wagon-steer cylinders operatively mounted on said vehicle for steering movement of said axle mounted in wagon-steer mode;
a source of pressurized hydraulic fluid flow for actuation of said steering cylinders;
a pilot valve and a manually controlled steering member for moving the pilot valve selectively in left and right steering control;
a steering control valve for controlling hydraulic flow to and from said steering cylinders, hydraulic connection means providing for movement of the control valve responsive to movements of said pilot valve;
hydraulic flow connections from said source through said steering control valve to said cylinders, said control valve being ported to admit hydraulic fluid sequentially first to said wagon-steer cylinders and only then to said articulated steer cylinders in both left and right steering control, whereby steering of the vehicle in both left and right directional steering is initially through wagon-steer movement of said wagon-steer mode axle facilitating high speed handling of the vehicle with relatively small directional changes;
a vehicle roll sensing circuit and means superimposed upon said steering control for acutating said steering control valve responsive to vehicle roll to steer said wagon-steer axle in correction of one or more of vehicle oversteer and addition of a desired level of understeer.

3. A two-part steering system for an articulated vehicle comprising:
an axle mounted on the vehicle in wagon-steer mode;

first hydraulic actuated jack means operatively connecting said axle vehicle for steering movement of the axle relative to said vehicle;

second hydraulic actuated jack means operatively mounted on the vehicle for articulation of the vehicle;

manual steering control for selective directional control of said vehicle through actuation of said first and second jack means;

means connecting said manual control and jack means for actuating said first and second jack means sequentially allowing small directional changes solely through movement of said wagon-steer mode axle, and a vehicle roll sensing circuit mounted on the vehicle and means superimposed upon said manual steering control for actuating said first jack means responsive to vehicle roll to steer said wagon-steer axle in correction of one or more of vehicle oversteer and addition of a desired level of understeer.

4. The steering system of claim 3 wherein said roll sensing circuit includes:

a transducer means mounted between the vehicle and said wagon-steer axle responsive to a predetermined roll angle of the vehicle with respect to said axle for generating a signal proportional to said roll angle;

a sensor operatively connected to the output of said transducer means effective to generate at least one of two solenoid signals when the output signal from the sensor exceeds a predetermined value; and a solenoid control pilot valve operatively connected to the output of said sensor and responsive to said solenoid signals for actuating said first jacks alternatively to correct for an oversteer vehicle condition and to add a desired amount of understeer without movement of the selective manual control.

* * * * *